J. E. Brooks.
Cultivator.

N°72598          Patented Dec. 24, 1867.

Witnesses
George W. Lehr
Henry Sachs

Inventor
Joseph E. Brooks
by Cushman
Attys

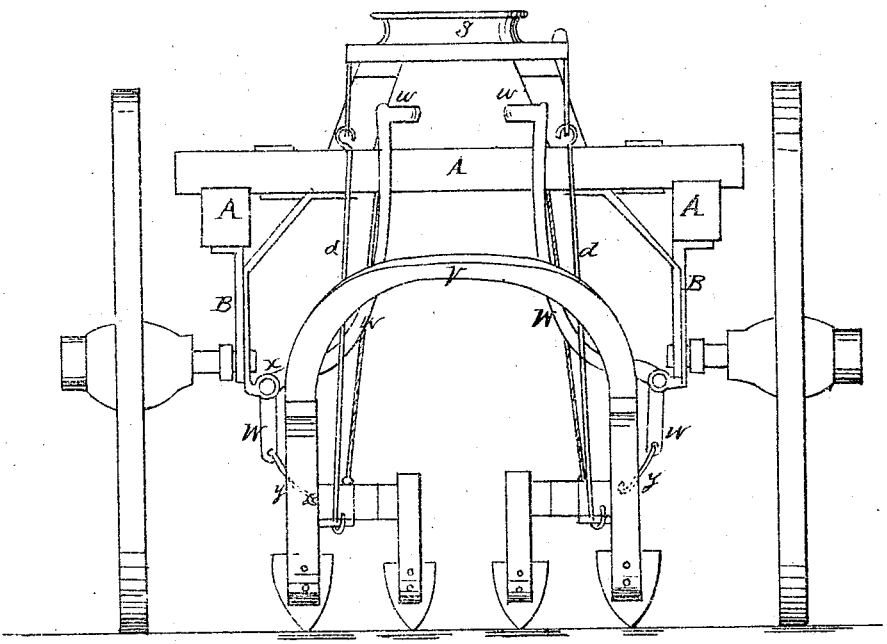

United States Patent Office.

JOSEPH E. BROOKS, OF GOODING'S GROVE, ILLINOIS.

Letters Patent No. 72,598, dated December 24, 1867; antedated December 19, 1867.

IMPROVEMENT IN CULTIVATORS.

The Schedule referred to in these Letters Patent and making part of the same.

TO ALL WHOM IT MAY CONCERN:

Be it known that I, JOSEPH E. BROOKS, of Gooding's Grove, in the county of Will, and State of Illinois, have invented a new and useful Improvement in Cultivators; and I do hereby declare and make known that the following is a full, clear, and exact description of the same, reference being had to the accompanying drawings, and the figures and letters marked thereon, which form part of this specification.

My said invention relates to that class of cultivators which are supported upon wheels, and which stride the row being cultivated, being provided with adjustable plough-beams, to adapt the machine to different kinds of soil, different stages in the growth of the corn, and to curves and irregularities in the rows; and it consists in various novel features, both in construction and arrangement, as will hereinafter be fully specified and described.

To enable those skilled in the art to understand how to construct and use my invention, I will proceed to describe the same with particularity, making reference in so doing to the aforesaid drawings, in which—

Figure 3 is a rear elevation thereof.

Similar letters of reference in the different figures denote the same parts of my invention.

Figure 1:
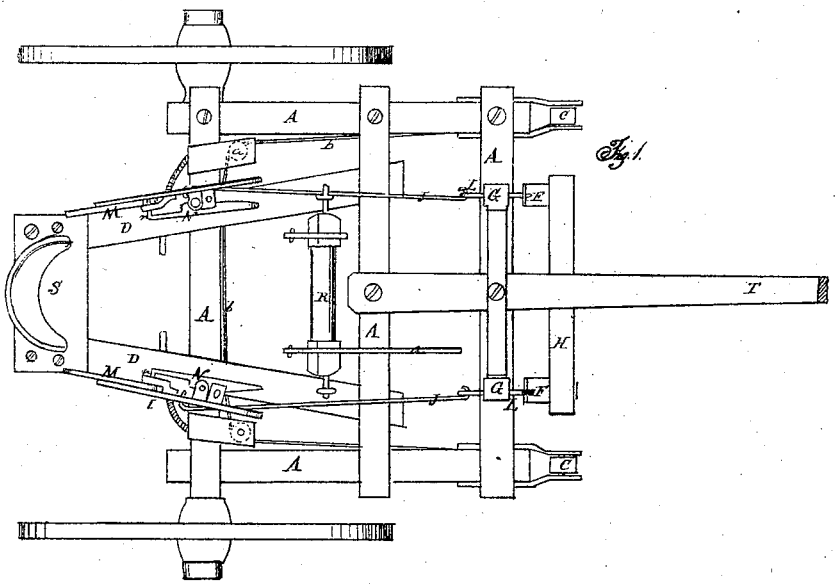
Figure 1 represents a plan or top view of my invention.
Figure 2:
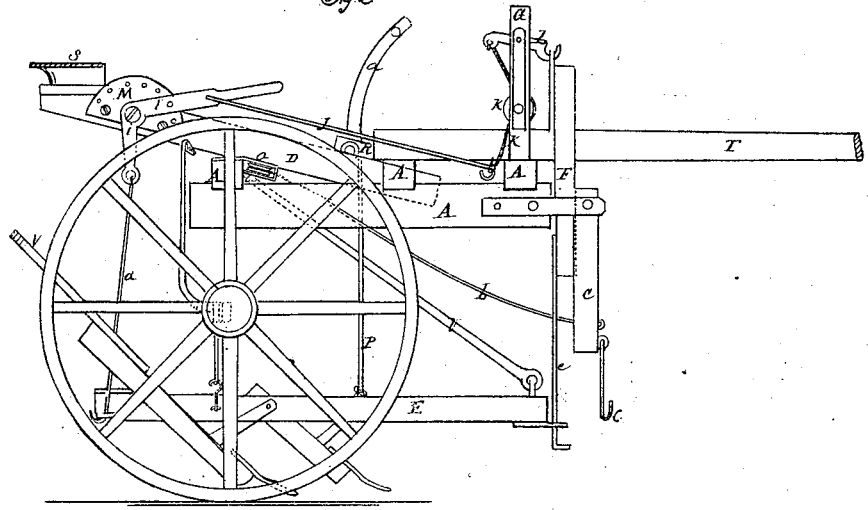
Figure 2 is a side elevation of the same.

A represents any suitable frame, the rear cross-piece of which is provided with pendent standards, B, at each end, upon whose lower ends are arranged suitable spindles for the wheels, as clearly seen in fig. 3. At the rear of the frame are arranged two sheaves or pulleys, $a\ a$, around which passes a cord, $b$, each end of which goes to be attached to the lower ends of the hangers C, pivoted to the front of the machine at each side, said hangers being provided with draught-hooks $c$, whereunto the horses are attached, said pivoted arrangement of said hangers serving to allow one horse to fall behind the other, in like manner as an ordinary double-tree, the cord $b$ moving upon said pulleys $a$ in the operation. The plough-beams E E are suspended at their rear ends upon rods $d$, or their equivalents, the upper ends of which are attached to the bent arms or levers I I, which are pivoted at $i$ to the supports D of the seat S. The front ends of said plough-beams are also suspended in like manner upon rods $e\ e$, which are suspended by means of the wooden bars F F upon levers L L, pivoted upon or to the upright posts G G upon the frame of the machine, as shown in fig. 2. To the opposite ends of said levers L L are attached the cords K K, which, passing around sheaves $k\ k$, are secured to the rods J J attached to the levers I I, before mentioned, as clearly shown in the drawings. To said levers I I are pivoted arms N, having pins $n\ n$ upon one end, and springs $o\ o$ under the opposite end, so that said springs throw the pins $n\ n$ into holes in the segments M, and thus secure the levers in any required position, which, however, may be changed, as desired, by pressing the ends of said arms N upon the spring and throwing out the pins $n\ n$.

By this arrangement the height of the ploughs may be controlled and adjusted at will, the ploughs upon the two sides of the row being at the same or different heights from the ground, as the case may require.

The said plough-beams are so attached to the rods $d\ e$ as to move up on said rods, should the surface of the ground vary so as to require such vertical movement, or either one may so move up, or either end of either or both the beams may so move up, thus providing for all emergencies in the most complete and effectual manner. The driver, from his seat, may adjust the said levers I I at pleasure, or he may, by means of the cord P, roller R, and handle Q, at once raise up the entire beams and ploughs clear from the ground, in case of any obstruction in the way requiring said operation.

The draught is applied to the beams E E by means of a strong rod, U, one end of which is secured to the rear cross-piece of the frame, or to the rear of the machine, in any suitable manner, by some flexible connection, and the other end being secured in like manner to the front end of the beams E, as clearly shown in fig. 2. Thus the movement of the cultivator pushes the beams forward and downward, thus serving to keep the ploughs down to their work. The rear ends of the plough-beams are connected, as shown in figs. 2 and 3, by means of a bow, V, secured upon the plough-standards, and sloping back in the same line as seen in said fig. 2. In fig. 3, W represents two bent rods or levers, pivoted at $x$ to the lower end of the standards B, the lower ends thereof being connected by a rod or chain, $y$, to the plough-beam, and the upper end being provided with stirrups or foot-rests $w\ w$, so that the driver, from his seat, may, by pressing his foot upon one or the other of said stirrups, move the ploughs laterally either way, as may be desired, in order to conform to any sinuosities or irregularities in the rows.

Having described the construction and operation of my invention, I will specify what I claim, and desire to secure by Letters Patent:

1. I claim the arrangement of rods U, with the frame of the machine and the plough-beams E E, substantially in the manner and for the purposes set forth.

2. I claim the arrangement of the draught-cord b, sheaves a a, and pivoted hangers C C, so as to operate substantially as and for the purposes described.

3. I claim the combination and arrangement of the plough-beams E, rods d e, lever L, cord K, rod J, and lever I, substantially as and for the purposes specified.

4. I claim the combination of the suspended plough-beams E, rods U, and levers W, arranged and operating as and for the purpose shown and set forth.

5. I claim the peculiar arrangement of and mode of attaching the bow V to the rear part of the plough-beams, herein shown and specified.

J. E. BROOKS.

Witnesses:
THOMAS FAGEN,
ORSON NICHOLS.